United States Patent
Kestelli

(10) Patent No.: US 7,831,844 B2
(45) Date of Patent: Nov. 9, 2010

(54) INTEGRATED POWERED DEVICE CONNECTOR IN SYSTEM FOR SUPPLYING POWER OVER COMMUNICATION LINK

(75) Inventor: Nevzat Akin Kestelli, Goleta, CA (US)

(73) Assignee: Linear Technology Corporation, Milpitas, CA (US)

( * ) Notice: Subject to any disclaimer, the term of this patent is extended or adjusted under 35 U.S.C. 154(b) by 1036 days.

(21) Appl. No.: 11/594,091

(22) Filed: Nov. 8, 2006

(65) Prior Publication Data

US 2007/0132487 A1 Jun. 14, 2007

Related U.S. Application Data

(60) Provisional application No. 60/749,048, filed on Dec. 12, 2005.

(51) Int. Cl.
G06F 1/00 (2006.01)

(52) U.S. Cl. .................. 713/300; 375/288; 379/399.01; 379/413

(58) Field of Classification Search ................. 713/300; 375/288; 379/399.01, 413
See application file for complete search history.

(56) References Cited

U.S. PATENT DOCUMENTS

| | | | |
|---|---|---|---|
| 6,473,608 B1 | 10/2002 | Lehr et al. | |
| 2003/0146765 A1 | 8/2003 | Darshan et al. | |
| 2004/0073597 A1 | 4/2004 | Caveney et al. | |
| 2004/0164619 A1 | 8/2004 | Parker et al. | |
| 2005/0080516 A1 | 4/2005 | Pincu et al. | |
| 2006/0212724 A1* | 9/2006 | Dwelley et al. | 713/300 |
| 2006/0215343 A1* | 9/2006 | Camagna et al. | 361/111 |
| 2008/0248684 A1* | 10/2008 | Filipon et al. | 439/485 |

OTHER PUBLICATIONS

Linear Technology, "LTC4259A, Quad IEEE 802.3af Power over Ethernet Controller with AC Disconnect" [Online, http://www.chipcatalog.com/Linear/LTC4259A.htm] 2003, pp. 1-32.
International Search Report for Corresponding Application No. PCT/US2006/045242 Mailed Mar. 14, 2007.
International Search Report and Written Opinion issued in corresponding International Patent Application No. PCT/US2006-047218, dated Apr. 5, 2007.
"Power over Ethernet: Cisco Inline Power and IEEE 802.3af," Internet Citation, 2004, Retrieved from the Internet.

(Continued)

*Primary Examiner*—Thomas Lee
*Assistant Examiner*—Jaweed A Abbaszadeh
(74) *Attorney, Agent, or Firm*—McDermott Will & Emery LLP

(57) ABSTRACT

An integrated connecting device for coupling a communication link to a powered device (PD) in a system for supplying power to the PD over the communication link. The integrated connecting device has a housing configured for providing connection to the PD external with respect to the housing, communication interface circuitry coupled to the communication link for supporting data communication of the PD over the communication link, and power interface circuitry coupled to the communication interface circuitry for implementing a power supply protocol performed to supply power to the PD over the communication link. The communication interface circuitry and the power interface circuitry being held by the housing.

22 Claims, 8 Drawing Sheets

OTHER PUBLICATIONS

International Search Report and Written Opinion issued in corresponding International Patent Application No. PCT/US2006/039273, mailed Feb. 20, 2007.

International Search Report and Written Opinion issued in corresponding International Patent Application No. PCT/US2006/043547, mailed Mar. 2, 2007.

IEEE Computer Society: 802.3af, "Part 3: Carrier Sense Multiple Access with Collision Detection (CSMA/CD) Access Method and Physical Layer Specifications Amendment: Data Terminal Equipment (DTE) Power via Media Dependent Interface (MDI)," IEEE Standards, Jun. 18, 2003, p. 1-121, The Institute of Electrical and Electronics Engineers, Inc, New York, New York.

Rohrmoser, M. et al., "Digital Connect ME Technical Product Specification," Jul. 2003, p. 1-7, UK, URL: http://www.entrix.co.uk/connect/data/digiConnectME_techprdspec.pdf.

"IntelliJack Switch Produktreihe," Aug. 2003, p. 1-4, URL: www.3com.de/pdf/intel_switch.pdf.

* cited by examiner (BACKGROUND)

INTEGRATED POWERED DEVICE CONNECTOR IN SYSTEM FOR SUPPLYING POWER OVER COMMUNICATION LINK

This application claims priority of and incorporates by reference provisional U.S. patent application No. 60/749,048 filed on Dec. 12, 2005, and entitled "SYSTEM AND METHOD FOR SUPPORTING ADVANCED POWER OVER ETHERNET SYSTEM."

TECHNICAL FIELD

This disclosure relates to power supply systems, and more particularly, to a device for connecting a powered device to a communication link, such as an Ethernet link, used for providing power to the powered device.

BACKGROUND ART

Over the years, Ethernet has become the most commonly used method for local area networking. The IEEE 802.3 group, the originator of the Ethernet standard, has developed an extension to the standard, known as IEEE 802.3af, that defines supplying power over Ethernet cabling. The IEEE 802.3af standard defines a Power over Ethernet (PoE) system that involves delivering power over unshielded twisted-pair wiring from a Power Sourcing Equipment (PSE) to a Powered Device (PD) located at opposite sides of a link. Traditionally, network devices such as IP phones, wireless LAN access points, personal computers and Web cameras have required two connections: one to a LAN and another to a power supply system. The PoE system eliminates the need for additional outlets and wiring to supply power to network devices. Instead, power is supplied over Ethernet cabling used for data transmission.

As defined in the IEEE 802.3af standard, PSE and PD are non-data entities allowing network devices to supply and draw power using the same generic cabling as is used for data transmission. A PSE is the equipment electrically specified at the point of the physical connection to the cabling, that provides the power to a link. A PSE is typically associated with an Ethernet switch, router, hub or other network switching equipment or midspan device.

PD is a device that is either drawing power or requesting power. Among examples of PDs are such devices as digital IP telephones, wireless network access points, PDA or notebook computer docking stations, cell phone chargers, HVAC thermostats, factory automation equipment, ID scanners, security systems, credit card terminals, and keyless entry systems.

PSE searches the link for a PD requesting power, optionally classifies the PD, supplies power to the link if a PD is detected, monitors the power on the link, and disconnects power when it is no longer requested or required. PD participates in the PD detection procedure by presenting a PoE detection signature defined by the IEEE 802.3af standard. If the detection signature is valid, the PD has an option of presenting a classification signature to the PSE to indicate how much power it will draw when powered up. Based on the determined class of the PD, the PSE applies the required power to the PD.

Since PD may be a small portable device, it would be desirable to decrease size of an arrangement required to support PoE procedures on the PD side. Therefore, there is a need for a compact integrated PD connector that would perform all functions required to support connection of PD to an Ethernet link.

SUMMARY OF THE DISCLOSURE

The present disclosure offers an integrated connecting device for coupling a powered device (PD) to a communication link configured for supplying power to the PD. The connecting device comprises a housing configured for providing connection to the PD external with respect to the housing. Communication interface circuitry is coupled to the communication link for supporting data communication of the PD over the communication link. Power interface circuitry is coupled to the communication interface circuitry for implementing a power supply protocol performed to supply power to the PD over the communication link. The communication interface circuitry and the power interface circuitry being held by the housing.

In particular, the housing may be configured so as to arrange the communication interface circuitry and the power interface circuitry inside the housing.

Alternatively, the housing may hold at least one element of the communication interface circuitry arranged inside the housing and at least one element of the power interface circuitry provided outside of the housing. An electronics connector may be arranged inside the housing for providing connection to elements of the power interface circuitry arranged outside of the housing.

The communication interface circuitry may be configured to support data communication of the PD over an Ethernet link and the power interface circuitry may be configured for powering the PD over the Ethernet link.

In accordance with one aspect of the disclosure, the power interface circuitry may include an auxiliary power supply circuit for powering the PD from an auxiliary power source. For example, the auxiliary power supply circuit may support powering the PD from a wall transformer.

The power interface circuitry may include a switching regulator for providing regulated output power supplied to the PD. The switching regulator may include a DC-to-DC converter.

The power interface circuitry may include an isolation circuit for providing electrical isolation of the PD from a power supply device that supplies power over the communication link.

The power interface circuitry may include bridge circuitry for enabling the PD to accept supplied power of either of two polarities.

In accordance with an embodiment of the disclosure, the power interface circuitry may include a signature circuit for providing identification of the PD in accordance with the power supply protocol, and a classification circuit for requesting a power level required by the PD in accordance with the power supply protocol. A load isolation circuit may be provided for preventing power from being supplied to the PD until a predetermined condition is detected.

A communication connector may be arranged in the housing for coupling the connecting device to the communication link. Also, a load connector may be arranged in the housing for coupling the connecting device to the PD.

In accordance with another aspect of the disclosure, a local area network (LAN) may comprise at least a pair of network nodes, a network hub, and communication cabling for connecting the network nodes to the network hub to provide data communications. The network hub has a power supply device for providing power to a PD over the communication cabling. The LAN further includes a LAN connector for coupling the PD to the LAN. The LAN connector has a housing configured for providing connection to the PD external with respect to the housing, communication interface circuitry coupled to the communication cabling for supporting data communication of the PD over the communication cabling, and power interface circuitry coupled to the communication interface circuitry for providing power to the PD over the communication cabling. The communication interface circuitry and the power interface circuitry are attached to the housing.

In particular, the communication interface circuitry and the power interface circuitry may be arranged inside the housing.

Alternatively, at least one element of the communication interface circuitry may be provided inside the housing and at least one element of the power interface circuitry may be attached to the housing and arranged outside of the housing.

In accordance with a further aspect of the disclosure, a power over Ethernet (PoE) system comprises a PD configured for being powered over an Ethernet link, and a PD connector for connecting the PD to the Ethernet link. The PD connector has a housing configured for providing connection to the PD external with respect to the housing, communication interface circuitry coupled to the Ethernet link for supporting data communication of the PD over the communication link, and power interface circuitry coupled to the communication interface circuitry for providing a PoE power supply protocol. The housing is configured to accommodate the communication interface circuitry and the power interface circuitry.

For example, the housing may be configured for placing the communication interface circuitry and the power interface circuitry inside the housing.

Alternatively, the housing may be configured for holding at least one element of the communication interface circuitry arranged inside the housing and at least one element of the power interface circuitry arranged outside of the housing.

Additional advantages and aspects of the disclosure will become readily apparent to those skilled in the art from the following detailed description, wherein embodiments of the present disclosure are shown and described, simply by way of illustration of the best mode contemplated for practicing the present disclosure. As will be described, the disclosure is capable of other and different embodiments, and its several details are susceptible of modification in various obvious respects, all without departing from the spirit of the disclosure. Accordingly, the drawings and description are to be regarded as illustrative in nature, and not as limitative.

BRIEF DESCRIPTION OF THE DRAWINGS

The following detailed description of the embodiments of the present disclosure can best be understood when read in conjunction with the following drawings, in which the features are not necessarily drawn to scale but rather are drawn as to best illustrate the pertinent features, wherein.

DETAILED DESCRIPTION OF THE EMBODIMENTS

The present disclosure will be made using the example of an integrated connector for coupling a PD to an Ethernet link in a PoE system. It will become apparent, however, that the concepts described herein are applicable to any connector configurable for connecting a device to a communication link in a system capable of providing power to the connected device over the communication link.

For example, the integrated connector of the present disclosure may be provided in a local area network (LAN) having a plurality of nodes, a network hub and communication cabling connecting the nodes to the network hub for providing data communications. The network hub may include a power supply device for providing power to a powered device over the communication cabling. The powered device may be coupled to the LAN using the integrated connector of the present disclosure.

Figure 1:
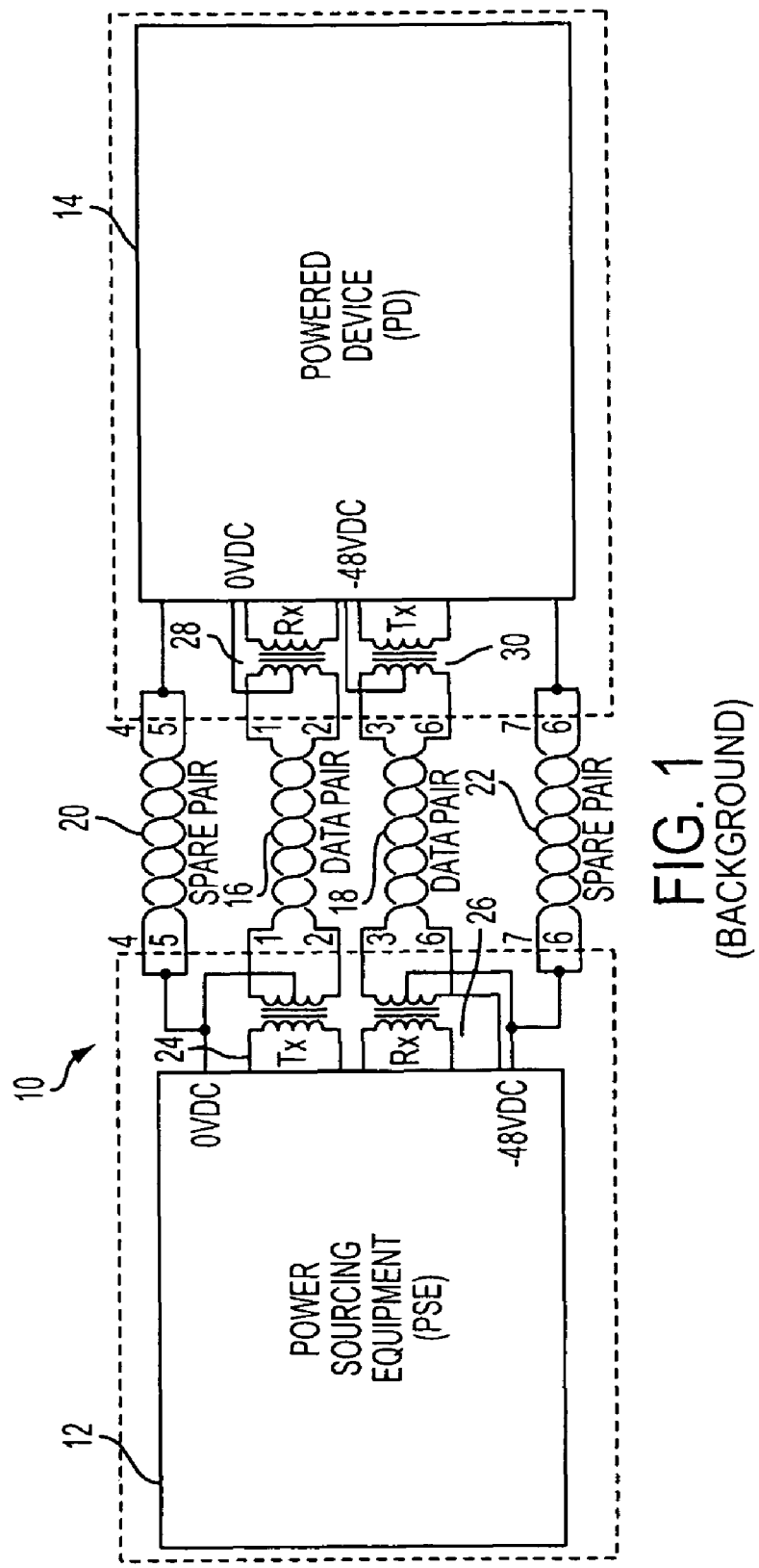
FIG. 1 is a diagram illustrating topology of a regular PoE system.

FIG. 1 illustrates a PoE system 10 in accordance with the 802.3af standard having an Ethernet link for transferring power from a PSE 12 to a PD 14. The Ethernet link has four pairs of conductors—data pairs 16 and 18 and spare pairs 20 and 22. The data pairs 16 and 18 are respectively provided between data transformers 24 and 26 on the PSE side and data transformers 28 and 30 on the PD side. These data transformers may be used for connecting physical layer (PHY) devices involved in the Ethernet data transmission.

The 802.3af standard indicates that the PSE 12 may be placed in 2 locations with respect to the Ethernet link. In particular, a PSE defined as an endpoint PSE may be arranged within data terminal equipment (DTE) or a repeater having a media dependent interface (MDI) that supports data transmission. Another type of a PSE defined as a midpoint PSE may be located within the link segment that is distinctly separate from the MDI and is between the MDIs.

The 802.3af standard indicates that Alternative A or Alternative B may be used for transferring power over the Ethernet. Alternative A involves transferring power only over the data pairs 16 and 18, and usually is used for supplying power from endpoint PSEs. Alternative B provides transferring power only over the spare pairs 20 and 22, and usually is used for supplying power from midpoints PSEs.

Figure 2:
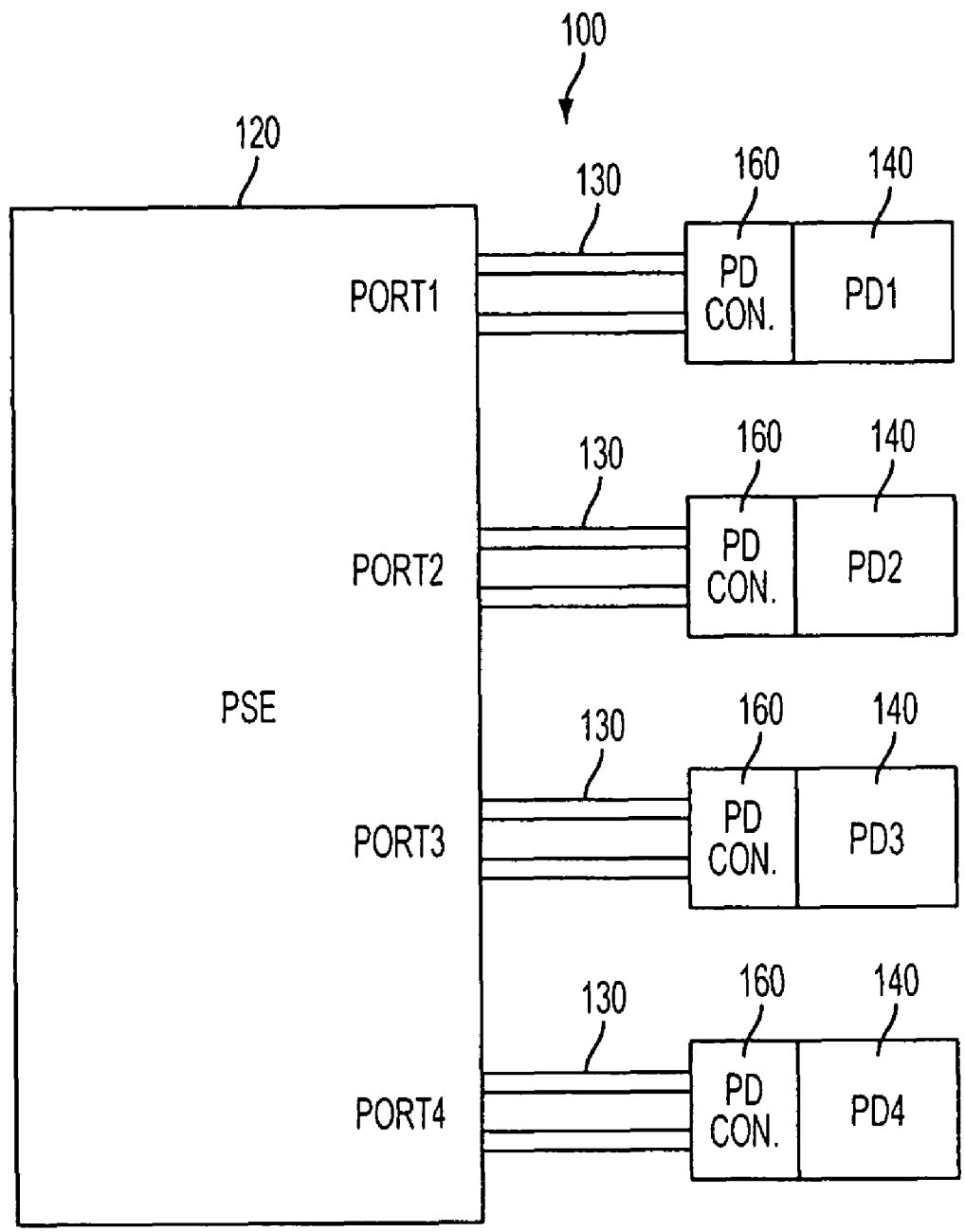
FIG. 2 illustrates a PoE system of the present disclosure.

FIG. 2 shows a simplified block-diagram illustrating a PoE system 100 of the present disclosure including PSE 120 having multiple ports 1 to 4 coupled to respective Ethernet links 130. Powered Devices 140 (PD1 to PD4) are connectable to the Ethernet links 130 via respective integrated PD connectors 160. Although FIG. 1 shows four ports of the PSE 120 and the respective number of PDs, one skilled in the art would realize that any number of ports may be provided to support the respective number of PDs.

The PSE 120 may interact with each PD 140 in accordance with the IEEE 802.3af standard. In particular, the PSE 120 and the PD 140 may participate in the PD detection procedure, during which the PSE 120 probes a link to detect the PD 140. If the PD 140 is detected, the PSE 120 checks the PD detection signature to determine whether it is valid or non-valid. The valid and non-valid detection signatures are defined in the IEEE 802.3af standard. While the valid PD detection signature indicates that the PD 140 is in a state where it will accept power, the non-valid PD detection signature indicates that the PD 140 is in a state where it will not accept power.

If the signature is valid, the PD 140 has an option of presenting a classification signature to the PSE 120 to indicate how much power it will draw when powered up. For example, a PD may be classified as class 0 to class 4. Based on the determined class of the PD, the PSE applies the required power to the PD over the respective Ethernet link.

Figure 3:
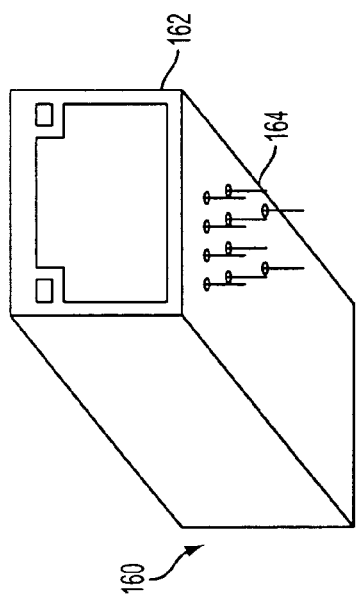
FIG. 3 illustrates an integrated PD connector of the present disclosure.

FIG. 3 shows an exemplary integrated PD connector 160 that may be used for coupling the PD 140 to the Ethernet link 130 in accordance with the present disclosure. For example, the PD 140 may be a digital IP telephone, a wireless network access point, a PDA or notebook computer docking station, a cell phone charger, an HVAC thermostat, factory automation equipment, an ID scanner, a security system, a credit card terminal, a keyless entry system, etc.

The PD connector 160 includes a housing 162 for holding data communication interface circuits and power interface circuits. As described in more detail below, these circuits are provided to support data communication and powering of the PD 140 over the Ethernet link. An eight-wire Ethernet connector, such as a Registered Jack-45 (RJ-45) connector, may be used for providing electrical connection between the PD connector 160 and the Ethernet cabling 130. The PD connector 160 may have connecting elements, such as printed circuit board (PCB) pins 164, for providing electrical connection between the PD 140 and the PD connector 160.

Figure 4:
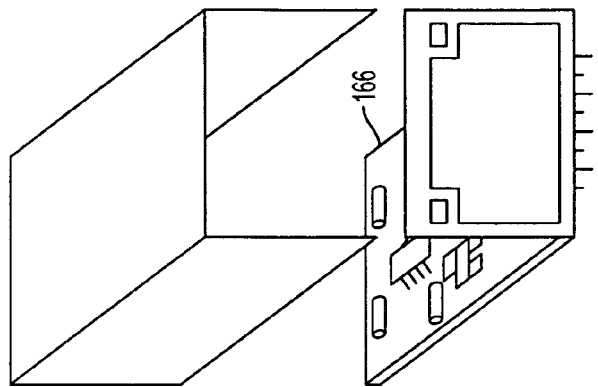
FIG. 4 illustrates an integrated PD connector of the present disclosure in which communication and powering circuitry are provided inside the housing.

Referring to FIG. 4 that shows the PD connector 160 without a cover, the data communication interface circuits and power interface circuits may be integrated inside the housing 162. For example, these circuits may be mounted on a circuit board 166 arranged inside the housing 162. Although FIG. 4 shows the data communication and power interface circuits arranged on a single circuit board, one skilled in the art would realize that various elements of the data communication and power interface circuits may be mounted on different circuit boards arranged inside the housing 162.

Figure 5:
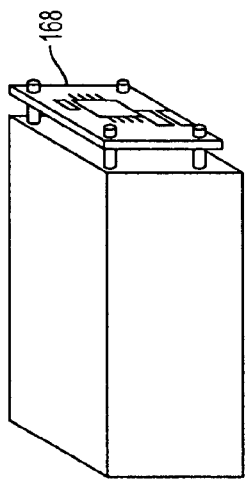
FIG. 5 illustrates an integrated PD connector of the present disclosure having a circuit board arranged outside of the housing.

Alternatively, as shown in FIG. 5, the data communication interface circuits may be incorporated inside the housing 162, whereas the power interface circuits may be provided on a circuit board 168 arranged outside of the housing 162 and physically attached to the housing 162. Although FIG. 5, shows a single external circuit board attached to the housing 162, one skilled in the art would realize that various elements of the power interface circuits may be arranged on separate circuit boards attached outside of the housing 162. Also, as described below, some elements of the power interface circuitry may be provided on one or more circuits boards attached outside the housing 162, whereas the other elements of this circuitry may be arranged inside the housing 162.

Figure 6:
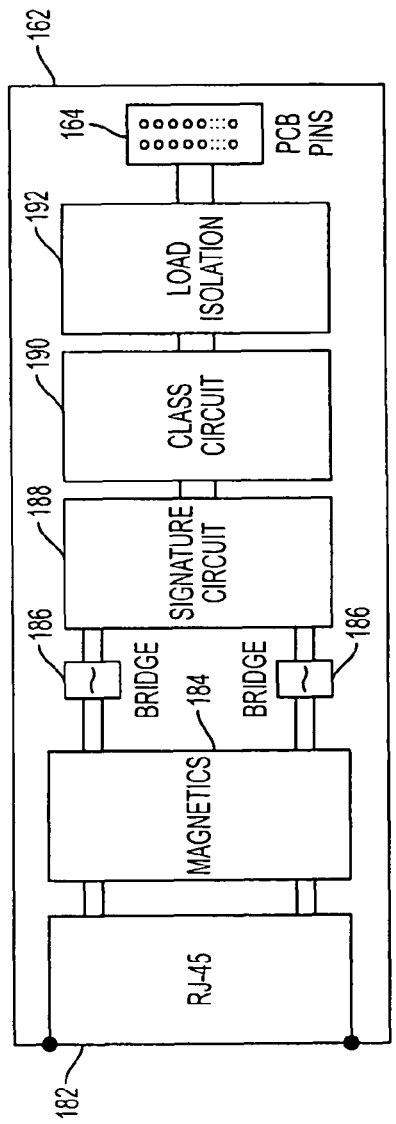
FIGS. 6 and 7 are block-diagrams illustrating an integrated PD connector of the present disclosure having circuits for implementing a PoE protocol.

FIG. 6 shows an exemplary embodiment of the integrated PD connector 160, in which data communication and power interface circuits are incorporated inside the housing 162. The integrated PD connector 160 may include a LAN connector 182, such as an RJ-45 connector, for coupling the PD connector 160 to Ethernet cabling. The LAN connector 182 is connected to data communication circuitry that may include magnetic components 184 and associated circuitry required for supporting Ethernet data communications protocols, such as 10BASE-T, 100BASE-T, 100BASE-TX and/or 1000BASE-T, performed to provide data communication of the PD 140 over the Ethernet network.

The power interface circuitry of the integrated PD connector 160 may include input diode bridge circuits 186 connected to the magnetic components 184 to enable the PD 140 to accept voltages of any polarity when power is supplied over the Ethernet link. To support PD detection procedure, the PD connector 160 includes a detection signature circuit 188 that presents a valid detection signature when the PD 140 is in a state where it will accept power. For example, the detection signature circuit 188 may include a 25K signature resistor representing a valid PD signature detectable by the PSE 120. The detection signature circuit 188 may include circuitry for enabling or disabling the 25K signature in order to control accepting power.

To support PD classification procedure, the PD connector 160 may include a classification circuit 190 that enables the PD 140 to transfer to the PSE 120 classification information. Based on this information, the PSE 120 may classify the PD 140. The classification information may indicate the maximum power required by the PD 140 during operation. The PD 140 may be classified as class 0 to class 4 based on power.

For example, in response to a probing voltage from the PSE 120, the classification circuit 190 may draw classification current representing a desired class of the PD 140. For class 0, the classification circuit 190 may draw current in the range from 0 mA to 4 mA; for class 1, the classification current may be from 9 mA to 12 mA; for class 2—from 17 mA to 20 mA; for class 3—from 26 mA to 30 mA; and for class 4, the classification circuit 190 may draw current from 36 mA to 44 mA. The classification circuit 190 may include a classification resistor $R_{CLASS}$ having a value selectable to set a desired magnitude of the classification current.

Alternatively, the PSE 120 may use probing current in the classification procedure. In this case, the classification circuit 190 may apply to the Ethernet link classification voltage having a magnitude that represents a selected class of the PD 140. Further, the classification circuit 190 may be enabled to provide various PD-related information to the PSE 120 in order to support desired interactions between the PSE 120 and the PD 140.

A load isolation circuit 192 may be provided at the output of the power interface circuitry to protect the PD 140 from undesired power supply signals delivered over the Ethernet link. The load isolation circuit 192 may monitor various parameters of power supply signals to determine whether or not to apply power from the Ethernet to the PD 140. Connecting elements, such as PCB pins 164, are arranged in the housing 162 to support electrical connection of the data communication and power interface circuits to the PD 140. All elements shown in FIG. 6 may be mounted on one or more circuit boards arranged inside the housing 162. The PCB pins 164 may protrude from the housing 162 to support connection to the PD 140.

Figure 7:
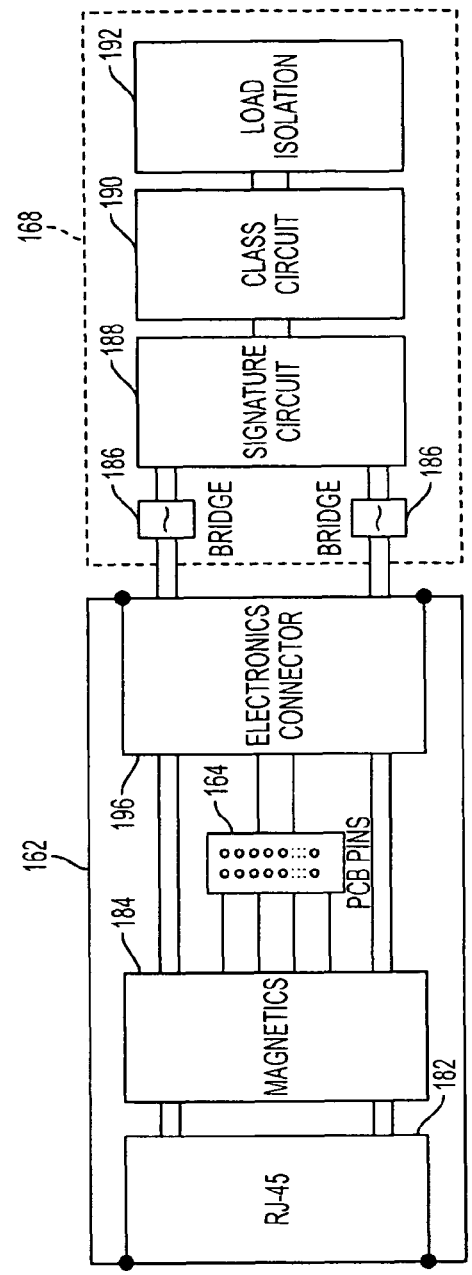

FIG. 7 illustrates an exemplary embodiment of the integrated PD connector 160, in which the data communication circuitry is incorporated inside the housing 162, whereas the power interface circuitry is provided on one or more circuit boards 168 attached outside of the housing 162 as shown in FIG. 5. In addition to the elements described in connection with FIG. 6, the integrated PD connector 160 in FIG. 7 includes an electronics connector 196 that may be provided inside the housing 162. The connector 196 supports electrical connection between the circuits arranged outside the housing 162 and the circuits mounted inside the housing 162. For example, the power interface circuits 186, 188, 190 and 192 may be arranged outside the housing 162 on the circuit board 168; whereas the Ethernet connector 182 and the magnetic components 184 may be arranged inside the housing 162. The PCB pins 164 may protrude from the housing 162 to support connection to the PD 140.

Figure 8:
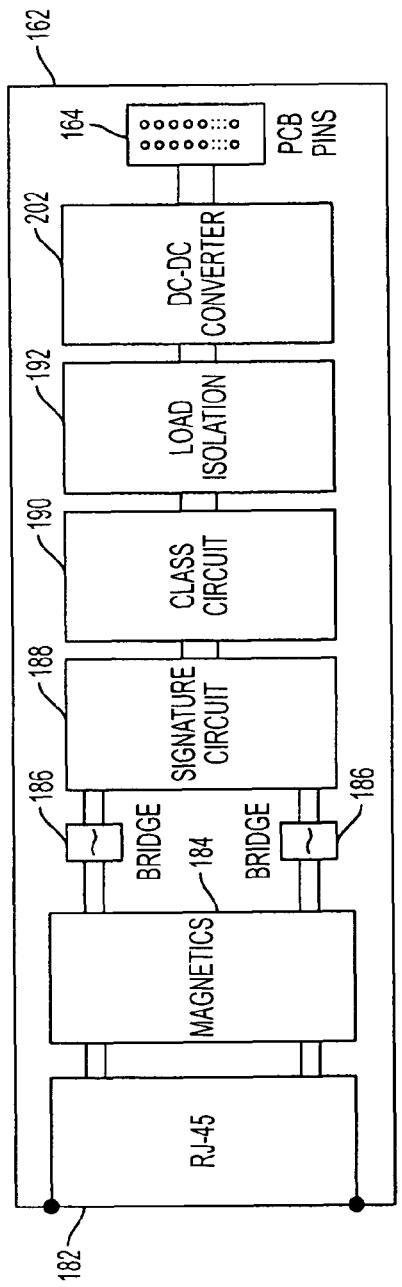
FIGS. 8 and 9 are block-diagrams illustrating an integrated PD connector of the present disclosure having a DC-to-DC converter.

FIG. 8 illustrates another embodiment of the present invention, in which in addition to the elements described above in connection with FIG. 6, the PD connector 160 includes a DC-to-DC converter 202 that may produce regulated output DC voltage required to support operation of the PD 140. The DC-to-DC converter 202 may be mounted on a circuit board arranged inside the housing 162. The other elements of the PD connector 160 may be arranged on the same circuit board or on separate circuit boards fixed inside the housing 162.

For example, the DC-to-DC converter 202 may be a switching regulator having a flyback configuration that enables generation of an output DC voltage less than or greater than an input DC voltage. Such an arrangement may provide a single output DC voltage, as well as multiple output DC voltages. Alternatively, the switching regulator may be arranged in a buck configuration to reduce an input DC voltage to a lower output DC voltage, in a boost configuration to provide an output DC voltage higher than an input DC voltage, or in a buck/boost configuration to generate an output DC voltage opposite in polarity with respect to an input DC voltage. Further, the switching regulator may be implemented as a forward DC-DC converter that directly transfers energy from its power supply input to the PD 140 during the on-time of the power switch.

Figure 9:
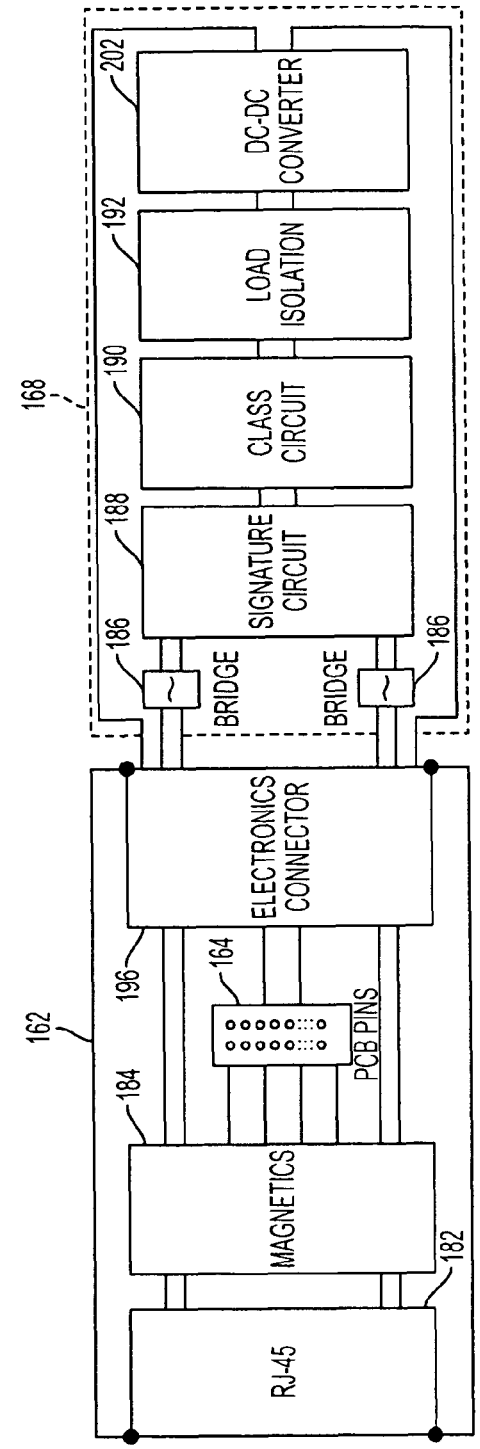

FIG. 9 illustrates an embodiment of the PD connector 160, in which the DC-to-DC converter 202 is provided outside of the housing 162. For example, the DC-to-DC converter 202 may be arranged on the circuit board 168, together with the bridges 186, signature circuit 188, classification circuit 190, and load isolation 192. Via the electronics connector 196, the DC-to-DC converter 202 may be coupled to the PCB pins 164 arranged for supporting electrical connection with the PD 140.

Figure 10:
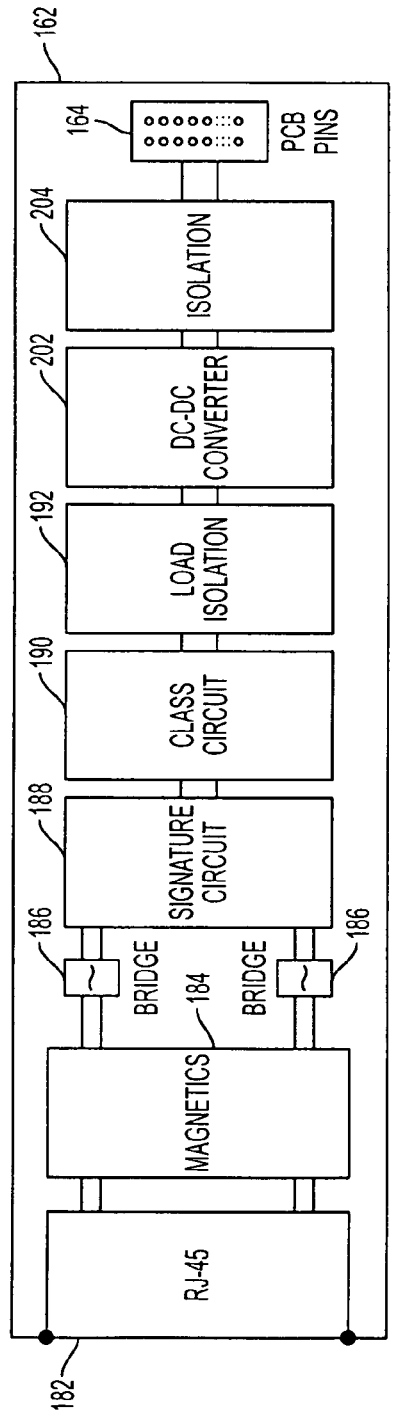
FIGS. 10 and 11 are block-diagrams illustrating an integrated PD connector of the present disclosure having an isolation barrier.
Figure 11:
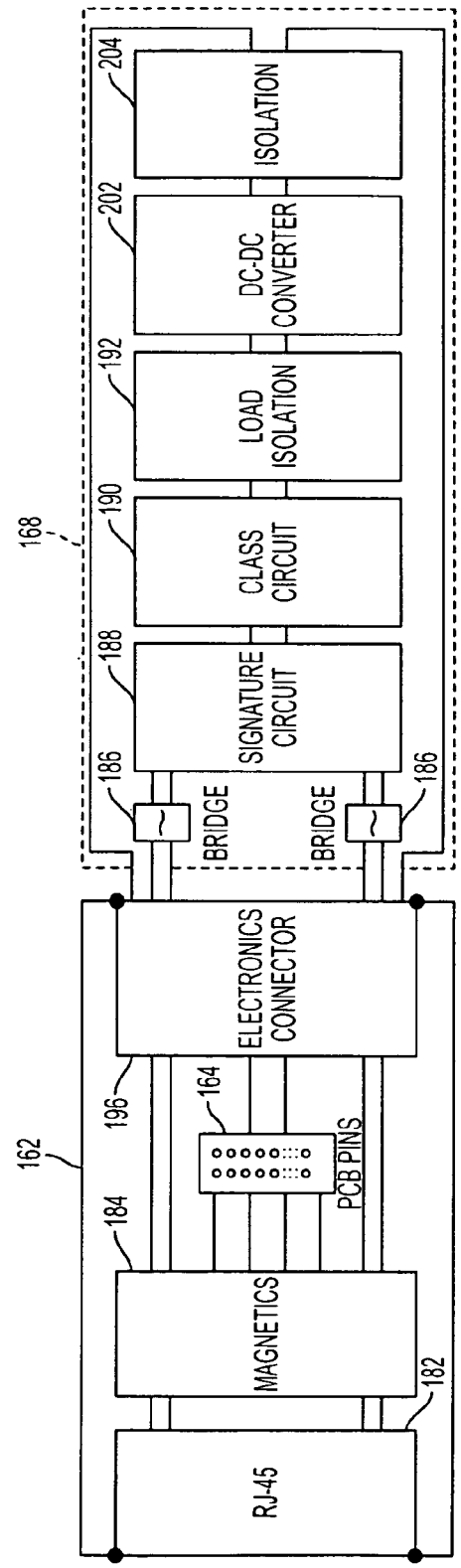

FIG. 10 shows an embodiment of the PD connector 160 having an additional isolation circuit 204 for providing electrical isolation of the PD 140 from the PSE 120. For example, the isolation circuit 204 may provide a barrier isolating the power plane of the PD 140 from the power plane of the PSE 120 to protect the PD 140 from damage caused by overvoltage events associated with the PSE 120. The isolation circuit 204 may be provided inside the housing 162. Alternatively, as shown in FIG. 11, the isolation circuit 204 may be arranged on the circuit board 168 mounted outside the housing 162.

Figure 12:
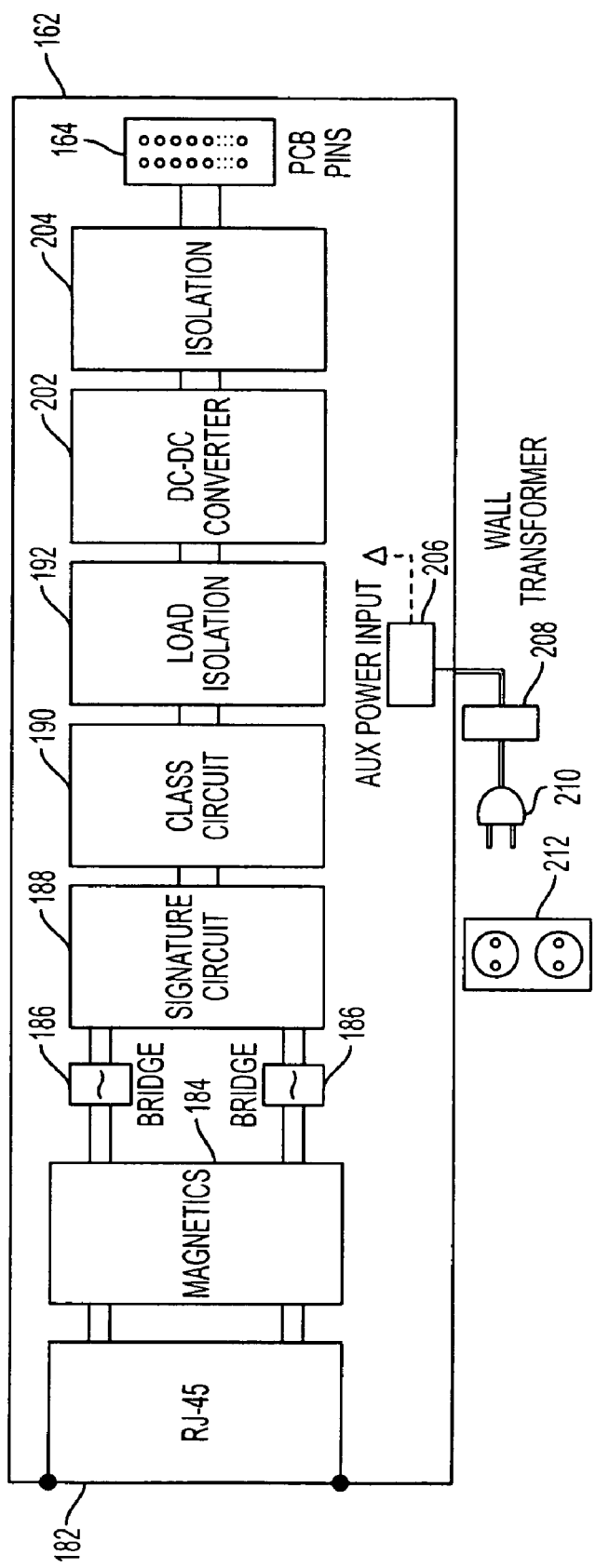
FIGS. 12 and 13 are block-diagrams illustrating an integrated PD connector of the present disclosure having a circuit for supporting auxiliary power supply.

FIG. 12 illustrates an embodiment of the present invention, in which the PD connector 160 incorporates an auxiliary power input circuit 206 for providing the PD 140 with alternative power supply from an auxiliary power source. In some applications, it may be desirable to power the PD 140 from an auxiliary power source such as a wall transformer or adapter 208 connectable to an AC power line using a power plug 210 and a power socket 212.

In particular, the auxiliary power source may power the PD 140 when the PSE 120 is not able to provide power requested by the PD 140. Also, when power supply from the PSE 120 is interrupted, the auxiliary power source may support PD operations performed to prevent the PD 140 from being damaged. For example, the auxiliary power source may provide power to retain volatile memory of the PD 140 while power supply from the PSE 120 is interrupted.

The auxiliary power may be injected into the PD connector 160 at several locations. In particular, the auxiliary power input circuit 206 may be provided after the isolation circuit 204 to inject the auxiliary power into the internal power plane of the PD 140. Also, the auxiliary power may be injected into the PD interface portion of the PD connector 160 before the isolation circuit 204. In accordance with the present disclosure, the auxiliary input circuit may be provided inside the housing 162 to prevent users of the PD 140 from accessing terminals that supply the auxiliary power.

The auxiliary power input circuit 206 may include a priority mechanism that selects a power input to the PD 140 between power from the PSE 120 and auxiliary power from the wall transformer 208. A diode OR circuit may be provided to support the priority mechanism. For example, if the power from the wall transformer 208 is provided in parallel with the power from the PSE 120, the priority mechanism may give priority to a higher supply voltage. If the wall transformer voltage is higher than the PSE voltage, the auxiliary power input circuit 206 may cause the PSE 120 to remove line voltage. On the other hand, if the wall transformer voltage is lower than the PSE voltage, the auxiliary power input circuit 206 may enable the PSE 120 to continue supplying power to the PD 140, and the wall transformer power will be rejected.

In the embodiment illustrated in FIG. 12, the auxiliary power input circuit 206 is arranged inside the housing 162, together with the magnetics 184, bridges 186, signature circuit 188, classification circuit 190, load isolation 192, DC-to-DC converter 202 and isolation circuit 204. This configuration allows the auxiliary power to be injected either before the isolation barrier 204 or after the barrier 204.

Figure 13:
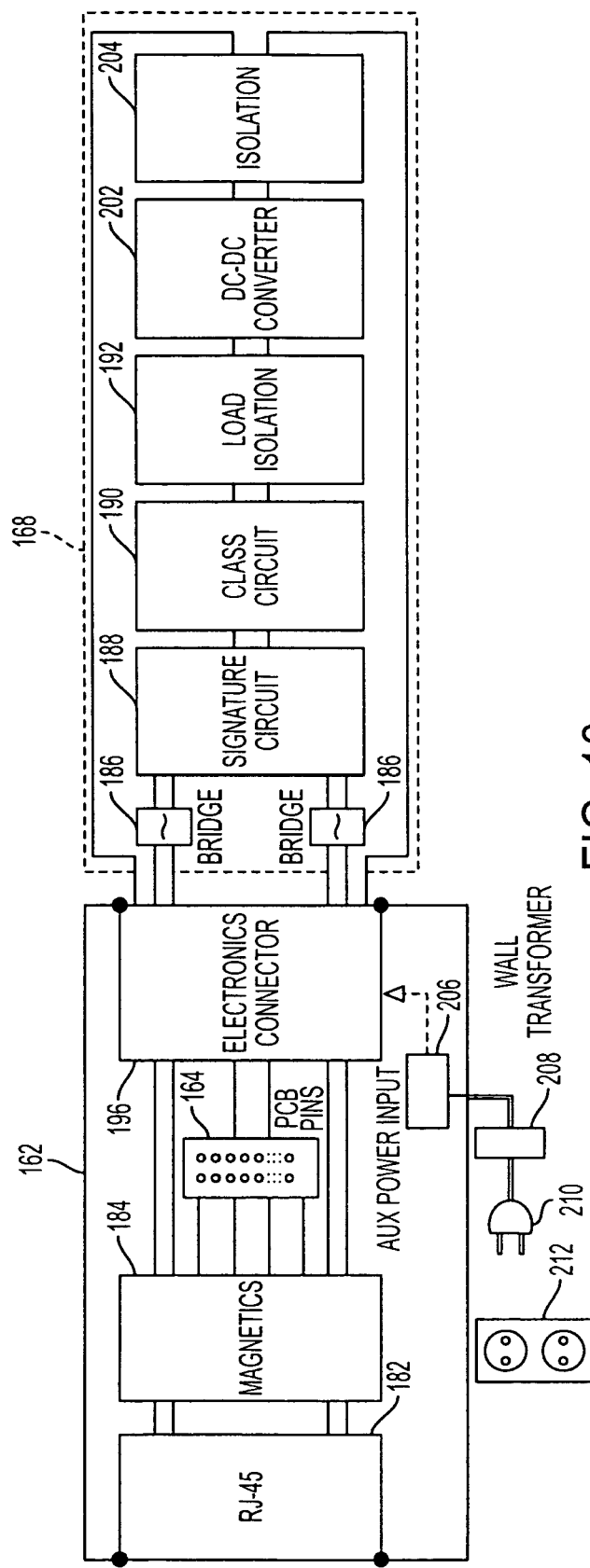

FIG. 13 illustrates another embodiment of the PD connector 160 having the auxiliary power input circuit 206. The auxiliary power input circuit 206 is arranged inside the housing 162 to prevent users from accessing power supplying terminals, whereas bridges 186, signature circuit 188, classification circuit 190, load isolation 192, DC-to-DC converter 202 and isolation circuit 204 may be mounted outside the housing 162, for example, on the circuit board 168. The auxiliary power may be supplied via the electronics connector 196.

The foregoing description illustrates and describes aspects of the present invention. Additionally, the disclosure shows and describes only preferred embodiments, but as aforementioned, it is to be understood that the invention is capable of use in various other combinations, modifications, and environments and is capable of changes or modifications within the scope of the inventive concept as expressed herein, commensurate with the above teachings, and/or the skill or knowledge of the relevant art.

The embodiments described hereinabove are further intended to explain best modes known of practicing the invention and to enable others skilled in the art to utilize the invention in such, or other, embodiments and with the various modifications required by the particular applications or uses of the invention.

Accordingly, the description is not intended to limit the invention to the form disclosed herein. Also, it is intended that the appended claims be construed to include alternative embodiments.

What is claimed is:

1. A connecting device for coupling a powered device (PD) to a communication link configured for supplying power to the PD, the connecting device comprising:

a housing configured for providing connection to the PD external with respect to the housing, communication interface circuitry coupled to the communication link for supporting data communication of the PD over the communication link, the communication interface circuitry including magnetics for supporting the data communication, and power interface circuitry coupled to the communication interface circuitry for implementing a power supply protocol carried out to supply power to the PD over the communication link, the magnetics and the power interface circuitry being held by the housing.

2. The device of claim 1, wherein the housing is configured for arranging the communication interface circuitry and the power interface circuitry inside the housing.

3. The device of claim 1, wherein the housing is configured for holding at least one element of the communication interface circuitry arranged inside the housing and for holding at least one element of the power interface circuitry arranged outside of the housing.

4. The device of claim 3, further comprising an electronics connector arranged inside the housing for providing connection to said at least one element of the power interface circuitry arranged outside of the housing.

5. The device of claim 1, wherein the communication interface circuitry is configured to support data communication of the PD over an Ethernet link and the power interface circuitry is configured for powering the PD over the Ethernet link.

6. The device of claim 1, wherein the power interface circuitry includes an auxiliary power supply circuit for powering the PD from an auxiliary power source.

7. The device of claim 5, wherein the auxiliary power supply circuit is configured for powering the PD from a wall transformer.

8. The device of claim 1, wherein the power interface circuitry includes a switching regulator for providing regulated output power supplied to the PD.

9. The device of claim 8, wherein the switching regulator includes a DC-to-DC converter.

10. The device of claim 1, wherein the power interface circuitry includes an isolation circuit for providing electrical isolation of the PD from a power supply device that provides power over the communication link.

11. The device of claim 1, wherein the power interface circuitry includes bridge circuitry to enable the PD to accept supplied power of either of two polarities.

12. The device of claim 1, wherein the power interface circuitry includes a signature circuit for providing identification of the PD in accordance with the power supply protocol.

13. The device of claim 1, wherein the power interface circuitry includes a classification circuit for requesting a power level required by the PD in accordance with the power supply protocol.

14. The device of claim 1, wherein the power interface circuitry includes a load isolation circuit for preventing power from being supplied to the PD until a predetermined condition is detected.

15. The device of claim 1 further comprising a communication connector arranged in the housing for coupling the connecting device to the communication link.

16. The device of claim 1 further comprising a load connector arranged in the housing for coupling the connecting device to the PD.

17. A local area network (LAN) comprising:
at least a pair of network nodes,
a network hub,
communication cabling for connecting the network nodes to the network hub to provide data communications, the network hub having a power supply device for providing power to a PD over the communication cabling, and
a LAN connector for coupling the PD to the LAN, the LAN connector including:
a housing configured for providing connection to the PD external with respect to the housing,
communication interface circuitry coupled to the communication cabling for supporting data communication of the PD over the communication cabling, and
power interface circuitry coupled to the communication interface circuitry for providing power to the PD over the communication cabling,
the communication interface circuitry and the power interface circuitry being attached to the housing.

18. The device of claim 17, wherein all elements of the communication interface circuitry and the power interface circuitry are arranged inside the housing.

19. The device of claim 17, wherein at least one element of the communication interface circuitry is provided inside the housing and at least one element of the power interface circuitry is attached to the housing and arranged outside of the housing.

20. A power over Ethernet (PoE) system comprising:
a PD configured for being powered over an Ethernet link, and
a PD connector for connecting the PD to the Ethernet link, the PD connector comprising:
a housing configured for providing connection to the PD external with respect to the housing,
communication interface circuitry coupled to the Ethernet link for supporting data communication of the PD over the Ethernet link, the communication interface circuitry including magnetics for supporting the data communication, and
power interface circuitry coupled to the communication interface circuitry for implementing a PoE power supply protocol,
the magnetics and the power interface circuitry being accommodated by the housing.

21. The device of claim 20, wherein the housing is configured for placing the communication interface circuitry and the power interface circuitry inside the housing.

22. The device of claim 20, wherein the housing is configured for holding at least one element of the communication interface circuitry arranged inside the housing and at least one element of the power interface circuitry arranged outside of the housing.

* * * * *